United States Patent [19]

Shanks

[11] Patent Number: 4,620,736

[45] Date of Patent: Nov. 4, 1986

[54] ADAPTOR PLATE FOR VEHICLE BUMPER

[75] Inventor: Teddy L. Shanks, Collinsville, Okla.

[73] Assignees: Franklin L. Best; Betty L. Best, both of Bartlesville, Okla.

[21] Appl. No.: 819,463

[22] Filed: Jan. 15, 1986

Related U.S. Application Data

[63] Continuation of Ser. No. 642,355, Aug. 20, 1984, abandoned.

[51] Int. Cl.[4] .............................................. B60R 19/48
[52] U.S. Cl. ..................... 293/116; 293/117; 293/155; 248/224.2; 280/415 A; 280/500; 224/42.03 R; D12/162
[58] Field of Search ...................... 293/117, 155, 116; 280/415 R, 415 A, 491 E, 505, 491 R, 495, 490 R, 500, 502; D12/157, 158, 172; 224/42.03 R, 42.07; 180/7.5; 248/223.4, 224.1, 224, 224.2, 316.1, 316.2, 316.3; 410/144, 152

[56] References Cited

U.S. PATENT DOCUMENTS

| 2,372,271 | 3/1945 | Heit | 280/500 |
| 2,798,756 | 7/1957 | Corydon, II | 293/155 |
| 3,400,949 | 9/1968 | Kendall | 280/490 R |
| 3,708,183 | 1/1973 | Jones | 280/490 R |
| 3,806,161 | 4/1974 | Pollart et al. | 280/500 |
| 3,837,675 | 1/1974 | Barnes et al. | 280/511 |
| 4,157,189 | 6/1979 | Poley | 280/500 |
| 4,176,580 | 12/1979 | Gallegos | 248/224.1 |

FOREIGN PATENT DOCUMENTS 1077792  8/1967  United Kingdom ............ 248/224.1

OTHER PUBLICATIONS

J. C. Whitney Catalog 422D, p. 153, Copyright 1982.

Primary Examiner—Robert B. Reeves
Assistant Examiner—Dennis H. Pedder
Attorney, Agent, or Firm—Head, Johnson & Stevenson

[57] ABSTRACT

This describes a special means for attaching an accessory such as a trailer hitch or winch to the bumper of a vehicle. It includes an accessory mount or a wedge insert insertable into a mounting frame or bracket. A tongue and groove assembly cooperates between the bracket and accessory mount for holding the accessory mount in position. Means are also provided for reinforcing the bumper.

4 Claims, 5 Drawing Figures

ADAPTOR PLATE FOR VEHICLE BUMPER

This is a continuation of co-pending application Ser. No. 642,355 filed on Aug. 20, 1984, now abandoned.

BACKGROUND OF THE INVENTION

This invention relates to a means for attaching an accessory such as a winch to a bumper of a vehicle.

One frequently wishes to add an accessory to the bumper. On one occasion, a trailer hitch may be needed. On other occasions, a winch may be needed. For example, a winch can be very useful in pulling other objects to the vehicle such as a stuck automobile or it can be useful in unsticking the vehicle to which winch is mounted by attaching the outer end of the winch line to a tree or suitable fence post and winching the vehicle itself out.

The following patents relate to various hitches for motor vehicles: U.S. Pat. Nos. 3,806,161; 3,922,006; 4,000,911; 3,837,675; 3,708,183 and 3,865,406.

SUMMARY OF THE INVENTION

It is an object of this invention to provide means whereby an accessory such as a trailer hitch or winch can be readily attached and detached from the bumper of a vehicle such as an automobile or jeep. It is a further object that the accessories may be quickly interchanged.

In general this invention relates to an adapter plate for a vehicle bumper. It includes a mounting frame or bracket which is grooved to receive an accessory mount or plate upon which may be supported any accessory desired such as a winch or trailer hitch. A tongue and groove means cooperates between the mounting frame and the accessory mount to secure it in position. In a preferred embodiment, the mounting frame is wedge shaped. The accessory mount is shaped to mate with the wedged recess of the mounting bracket. The mounting frame is bolted or otherwise secured to a bumper of a vehicle. A reinforcing member may be applied to the bumper adjacent the mounting frame.

Other objects and a better understanding of the invention can be had from the following description taken in conjunction with the drawings.

DESCRIPTION OF THE PREFERRED EMBODIMENT

Figure 1:
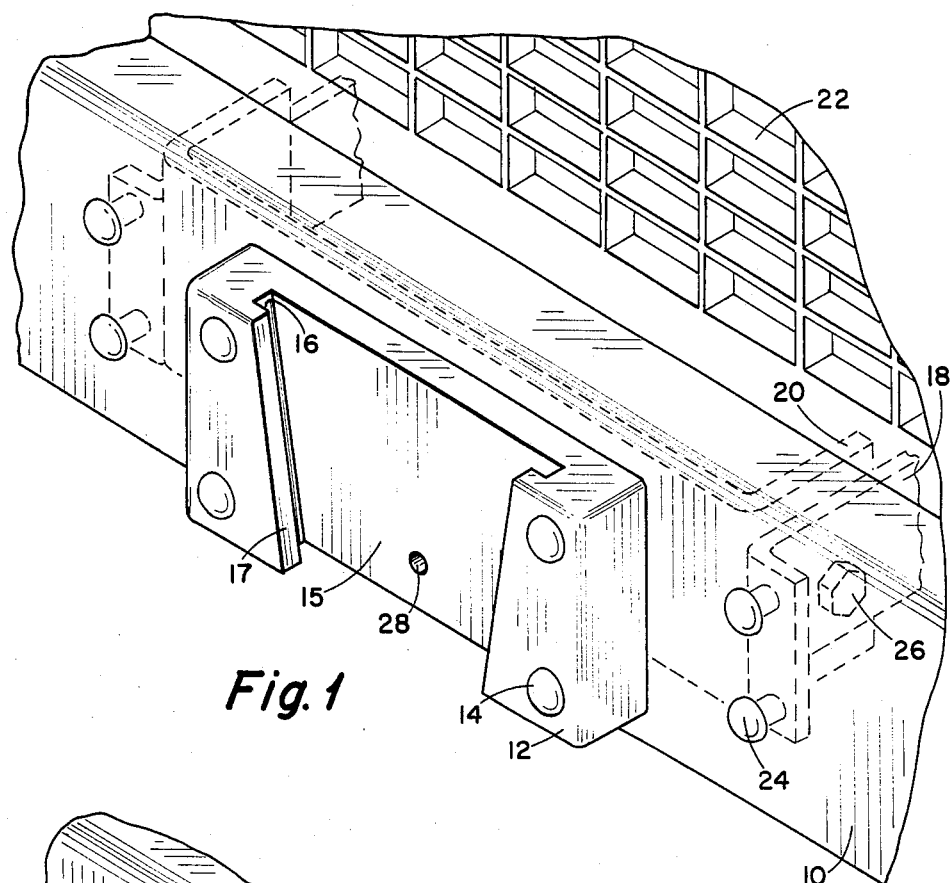
FIG. 1 is an isometric view of the front end of a vehicle showing the mounting frame secured to a bumper.

Reference is first made to FIG. 1 which shows a bumper 10 mounted on a vehicle having a grill 22. The bumper is connected by bolts 24 to frame 18 which is connected to the main frame of the vehicle. This vehicle may be a jeep, a car, a pickup, or any other. A mounting frame or bracket 12 is connected by bolts 14 to bumper 10. The bracket 12 is essentially vertical. The bracket 12 may be mounted in a normal recess provided on a vehicle bumper or it may just be on the bumper proper if desired, or, it there is no recess available. The mounting frame 12 is provided with a wedge shape cut out or recess 15 having a groove 16. The wedge is wider at the top than at the bottom. In an embodiment, side 17 makes an angle of 10° with the vertical. The bracket 12 is also provided with a hole 28 for receiving detent pin 32 illustrated in FIGS. 2 and 3.

Depending upon the accessory which one wishes to use, it may be that the bumper 10 is not sufficiently strong to support that particular accessory. In that case, one should add a reinforcing member 20 which extends along the rear of the bumper along the length of the frame or bracket 12. The reinforcing member 20 can be connected by bolts 26 to vehicle frame 18 and by bolts 14 to the bumper.

Figure 2:
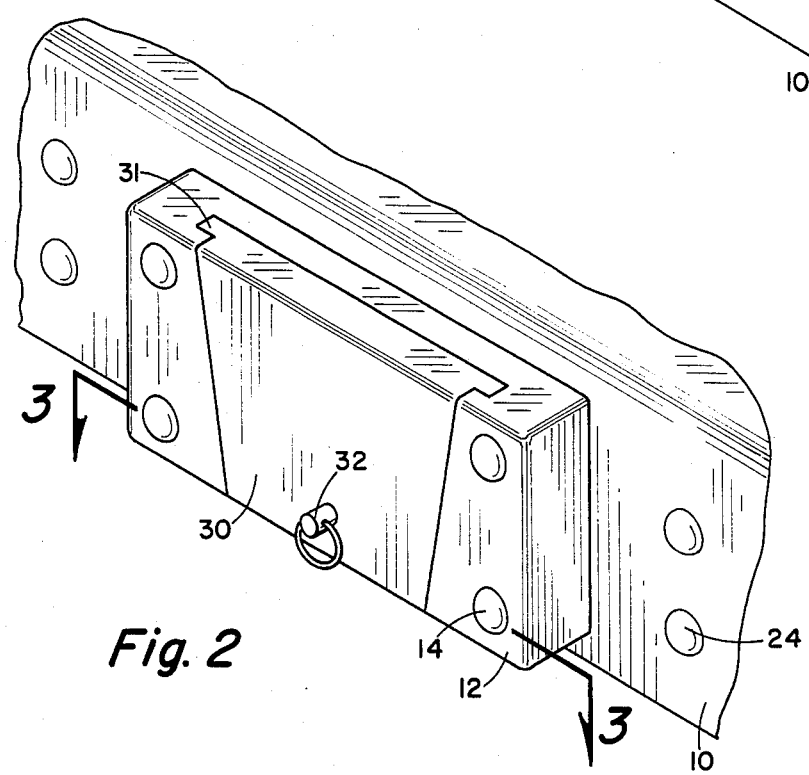
FIG. 2 is an isometric view of the mounting frame and a portion of the bumper of FIG. 1 with an accessory mount inserted therein.
Figure 3:
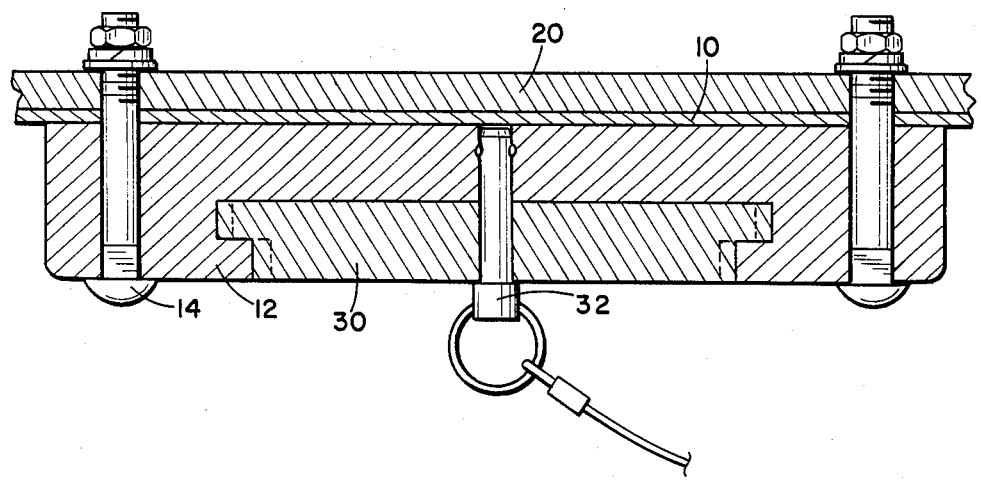
FIG. 3 is a view mostly in cross-section taken along the line A—A of FIG. 2.

Attention is next directed to FIG. 2 which illustrates the accessory mount or wedge insert 30 having tongue 31. The wedge insert 30 fits into wedge-shaped recess 15 and tongue 31 mates with groove 16. As will be explained in relation to FIGS. 4 and 5, any desired accessory can be attached or fixed to wedge insert 30. Due to the wedge shape of the insert and the recess 15, the wedge insert will normally be held securely in the cut out or wedge shaped recess 15. The plane of the accessory mount 30 is essentially perpendicular to the direction of motion of the vehicle. Because the mount in frame 12 is vertical, it would be nearly impossible for the wedge insert 30 to bounce out. However, if desired, a detent pin 32 can be inserted through the wedge insert 30 into hole 28 of the bracket 12. This is also clearly shown in FIG. 3.

Figure 5:
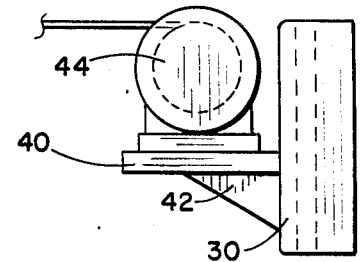
FIG. 5 is similar to FIG. 4 except a different accessory is supported by the accessory mount.

Any desired accessory can be fixed to wedge insert 30. One of the more common type accessories would be a winch as illustrated in FIG. 5. Shown thereon is a winch 44 upon base 40 and gusset 42. The base 40 and gusset 42 are securely attached to the wedge insert 30. Inasmuch as the wedge insert 30 is relatively inexpensive, the support for winch 44 should be welded thereto. The winch 44 can be either a hand crank winch or an electric winch which can be operable from the battery of the vehicle.

Figure 4:
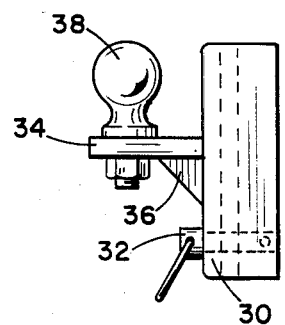
FIG. 4 is a schematic end view of the mounting means with accessory thereon.

Another accessory which is commonly needed is the ball hitch shown in FIG. 4. Shown therein is a ball 38 on base 34 and gusset 36. This base 34 and gusset 36 are preferably welded to wedge insert 30.

One can have any accessory desired mounted on a wedge insert 30. One can interchange them within seconds. All that is necessary to do is to remove detent pin 32 (if a detent pin is used), remove the wedge insert and accessory mounted thereon and then replace this with a second wedge insert having the desired accessory mounted thereon by simply sliding wedge insert 30 into recess 15. Another advantage of this system is that when it is no longer needed to use the accessory such as the winch, it can be readily removed from the wedge shaped recess simply by removing detent pin 32 and lifting it out. The accessory, which if it is a winch, may then be placed in the truck of an automobile or someplace where it will not be subject to the elements. Then, when it is desired to use it again, it is very easy to reinsert it.

While the invention has been described with a certain degree of particularity, it is manifest that many changes may be made in the details of construction without departing from the spirit and scope of this disclosure. It is understood that the invention is not limited to the embodiments set forth herein for purposes of exemplification, but is limited only by the scope of such claim or claims including the full range of equivalancy to which each element thereof is entitled.

What is claimed is:

1. A mechanism for easy attachment and removal of an accessory to the bumper of a motor vehicle which comprises:

a bracket means having a front side with a substantially flat front surface and a back side and mountable in a substantially vertical position on the face of said bumper, said bracket means having a niche on the front side thereof, said niche being wider at a top than at a bottom and incorporating a groove along each lateral side of said niche;

a plate member being wedge shaped;

a tongue being an integral part of said plate member and cooperating with the grooves of said bracket means and said plate member to secure said plate member to said bracket means;

means for mounting an accessory upon said plate member;

a reinforcing member in contact with a rear side of said bumper and adjacent said bracket and attached to and in contact with a frame of said vehicle.

2. A mechanism as defined in claim 1 including a common securing means for securing the bracket means and the reinforcing member to said bumper.

3. A mechanism for easy attachment and removal of an accessory to the bumper of a motor vehicle which comprises:

a wedge shaped plate;

a substantially flat plate-like bracket having a front surface and a back and a top and a bottom for holding said plate and mountable in a substantially vertical position on the face of said bumper, said bracket front surface having a wedged shaped niche having two sloping sides, said niche is wider at the top than at the bottom and incorporating a groove along the sides of said niche;

a tongue being an integral part of said plate and of a size to fit into said groove in said niche;

means for mounting an accessory upon said plate.

4. A mechanism as defined in claim 3 in which said plate is coplanar with said bracket.

* * * * *